Aug. 24, 1954  W. R. CUSTER  2,687,262

JET PROPELLED CHANNELED AIRCRAFT

Original Filed Sept. 19, 1947

INVENTOR.
W. R. Custer
BY
Bernad B. Gurvey
ATTORNEY

Patented Aug. 24, 1954

2,687,262

UNITED STATES PATENT OFFICE 2,687,262

JET PROPELLED CHANNELED AIRCRAFT

Willard R. Custer, Hagerstown, Md.

Original application September 19, 1947, Serial No. 775,107, now Patent No. 2,611,556, dated September 23, 1952. Divided and this application November 27, 1951, Serial No. 258,370

3 Claims. (Cl. 244—12)

1

This invention is a jet propelled channeled aircraft and is a division of my co-pending application filed September 19, 1947, Serial No. 775,107, now Patent 2,611,556.

As appears from the objects of my said application, Serial No. 775,107, this invention contemplates the use of the Custer channel wing with jet or rocket propulsion means for use as an aircraft or pilotless missile. The Custer channel provides high static lifting potential and when equipped with jet propulsion means, in accordance with the teaching of this invention, will induce a rearward flow of fluid adjacent the inside channel surface to provide an aircraft suitable for flight at transonic and supersonic speeds combined with high lift at low speeds during take-off and landing.

Other objects of the invention will be apparent from the following description of the invention taken in connection with the accompanying drawings wherein.

Figure 1:
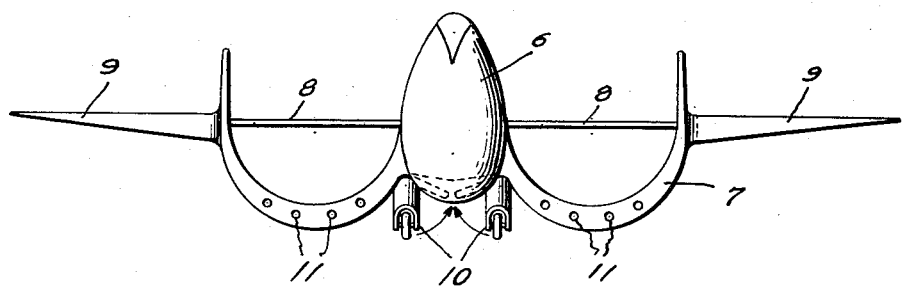
Fig. 1 is a front elevational view of an airplane or missile, constructed in accordance with the present invention, embodying a plurality of jets mounted in the bottom walls of the channels.

In the form of invention illustrated in Fig. 1 of the invention, a fuselage 6 is used which may be of conventional design and is equipped with laterally-extending channels 7 which are semi-cylindrical, open upwardly and extend in the direction of flight. The channels are provided with braces 8 which extend across the channel from a side of the fuselage to the inner wall of the channel as shown in the drawing. Also in this form of the invention airfoiled wings 9 are disposed contiguous with and spanwise from the channels 7.

On the bottom of the fuselage a retractible landing gear 10 is mounted which may be folded into the bottom of the fuselage as shown in dotted lines.

A plurality of jets, rockets or other jet propulsion means 11 are mounted in the channel 7,

2 preferably in the base, as shown in the drawing. The inlet ports of the jets being in the leading edges of the channels, the outlet openings being arranged in the bases of the channels intermediate the fore and aft edges thereof after the manner shown in the modified form of invention illustrated in Fig. 2, hereinafter described. By arranging the jets in this manner, a rearward flow of fluid will be induced adjacent the inside channel surface to provide an aircraft or missile adapted for flight at any desired speeds combined with high lift even at low speeds during take-off and landing.

Figure 2:
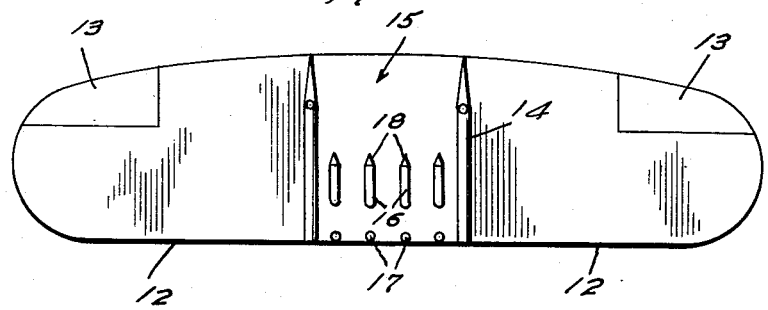
Fig. 2 is a top plan view of a modified form of the invention in the nature of a flying wing embodying a channel with jets mounted in the channel.
Figure 3:
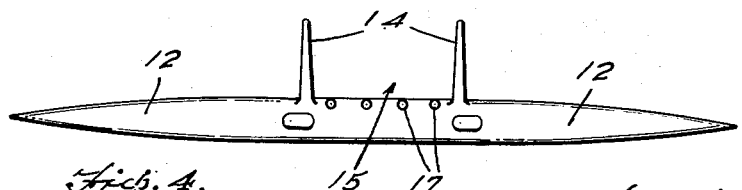
Fig. 3 is a front elevational view of the same.

In the form of invention illustrated in Figs. 2 and 3, a flying wing 12 is provided, the wing being equipped with ailerons 13, as illustrated in Fig. 2. Upright spaced fins or baffles 14 are mounted on the top surface of the wing to form a channel 15. Jets or rockets 16 are mounted in the base of the channel with their inlet ports 17 opening through the wing at a point adjacent the leading edge of the latter, as shown in Fig. 2. The outlet or exhaust ports of the jets, designated 18, open through the base of the channel, at a point approximately midway the ends of the latter, as shown in Fig. 2. The jets or rockets 16 operate in this form of the invention the same as the jets 11 in the form of invention illustrated in Fig. 1.

Figure 4:
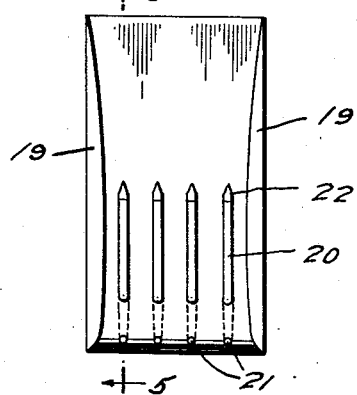
Fig. 4 is a top plan view of a further modification of the invention wherein a channel per se is employed having a plurality of ram jets or rockets mounted in the channel.
Figure 5:
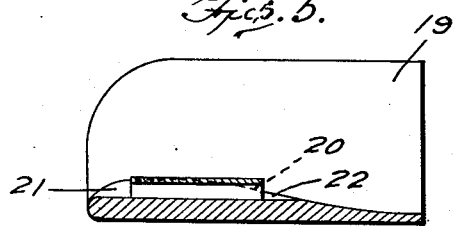
Fig. 5 is a cross sectional view of the channel taken on the line 5—5 of Fig. 4 looking in the direction of the arrows.

The form of invention illustrated in Figs. 4 and 5 consists of a channel 19 which opens upwardly and extends in the direction of flight and may be of any desired shape such as semi-cylindrical, as shown in Fig. 1, or substantially square, as shown in the form of invention illustrated in Figs. 2 and 3. The base of the channel carries a plurality of jets or rockets 20, the inlet ports 21 of which are adjacent the leading edge of the wing while the outlet or exhaust ports 22 terminate at a point approximately midway the ends of the channel. In this form of invention the jets or rockets operate in exactly the same manner and with the same results as the jets 11 of Fig. 1 and the jets 16 of Figs. 2 and 3.

While preferred forms of the invention are herein shown and described, it is understood that various changes may be made therein within the scope of the claims hereto appended.

What I claim is:

1. An aircraft comprising an upwardly opening channel having a leading edge and disposed in the direction of flight, and jet propulsion means mounted in the channel, said jet propulsion means having an inlet opening facing in the direction of flight immediately adjacent the leading edge of the channel, said means having an expulsion end intermediate the fore and aft ends of the channel to effect a rearward flow of fluid adjacent the inside channel surface.

2. An aircraft comprising an upwardly opening channel having a leading edge and disposed in the direction of flight, and jet propulsion means mounted in the channel and having an opening facing in the direction of flight in the front surface of the leading edge of the channel, said means having an expulsion end intermediate the fore and aft ends of the channel to effect a rearward flow of fluid adjacent the inside channel surface.

3. An aircraft comprising an upwardly opening channel having a leading edge and disposed in the direction of flight, and jet propulsion means in the channel including jet inlet openings in the leading edge of the channel opening in the direction of flight and complemental jet outlet openings intermediate the fore and aft edges of the channel to induce a rearward flow of fluid adjacent the inside channel surface.

References Cited in the file of this patent

UNITED STATES PATENTS

| Number | Name | Date |
|---|---|---|
| 1,353,955 | Hering | Sept. 28, 1920 |
| 2,004,256 | Trey | June 11, 1935 |
| 2,437,732 | Ferrel | Mar. 16, 1948 |